Patented Apr. 25, 1950

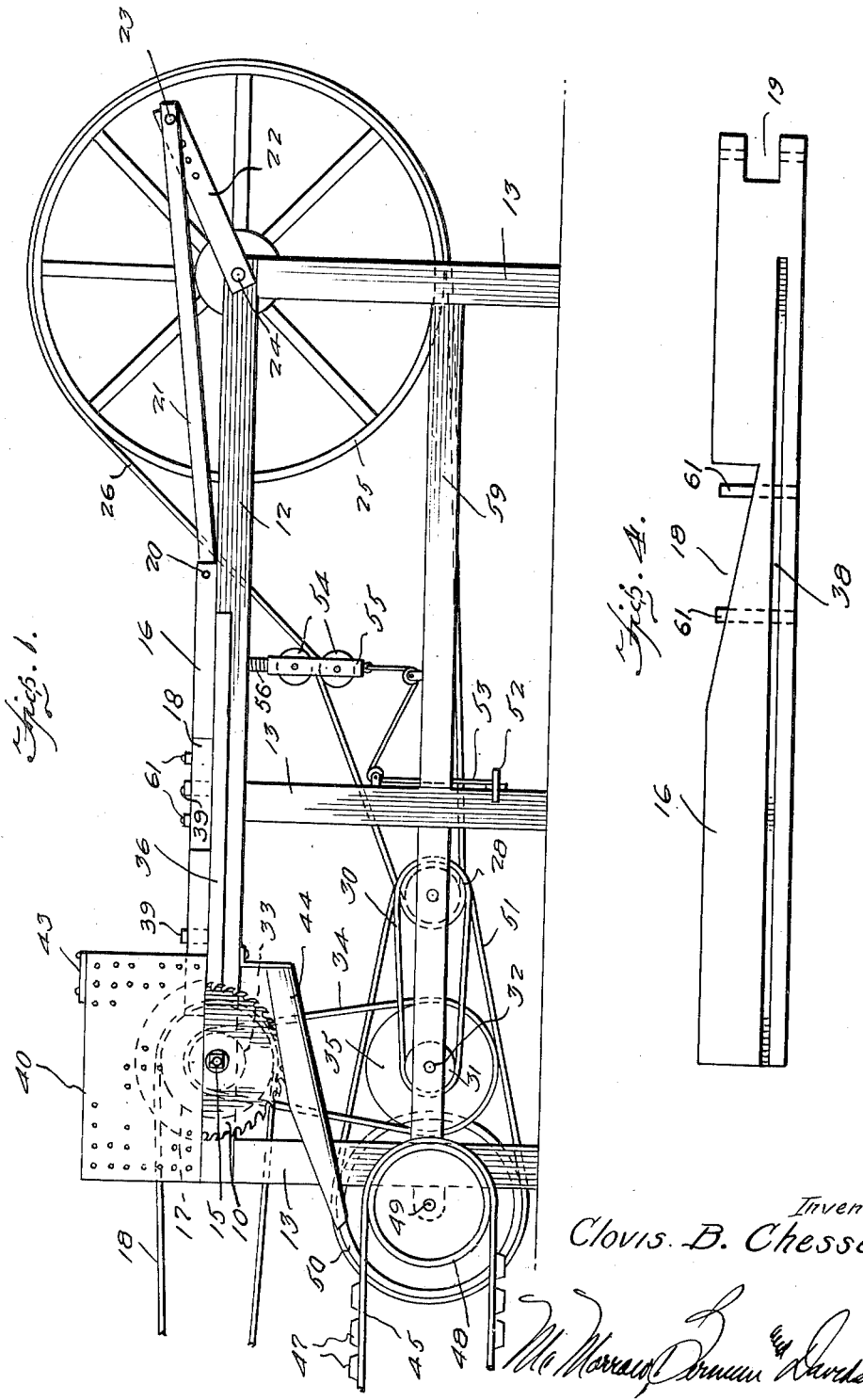

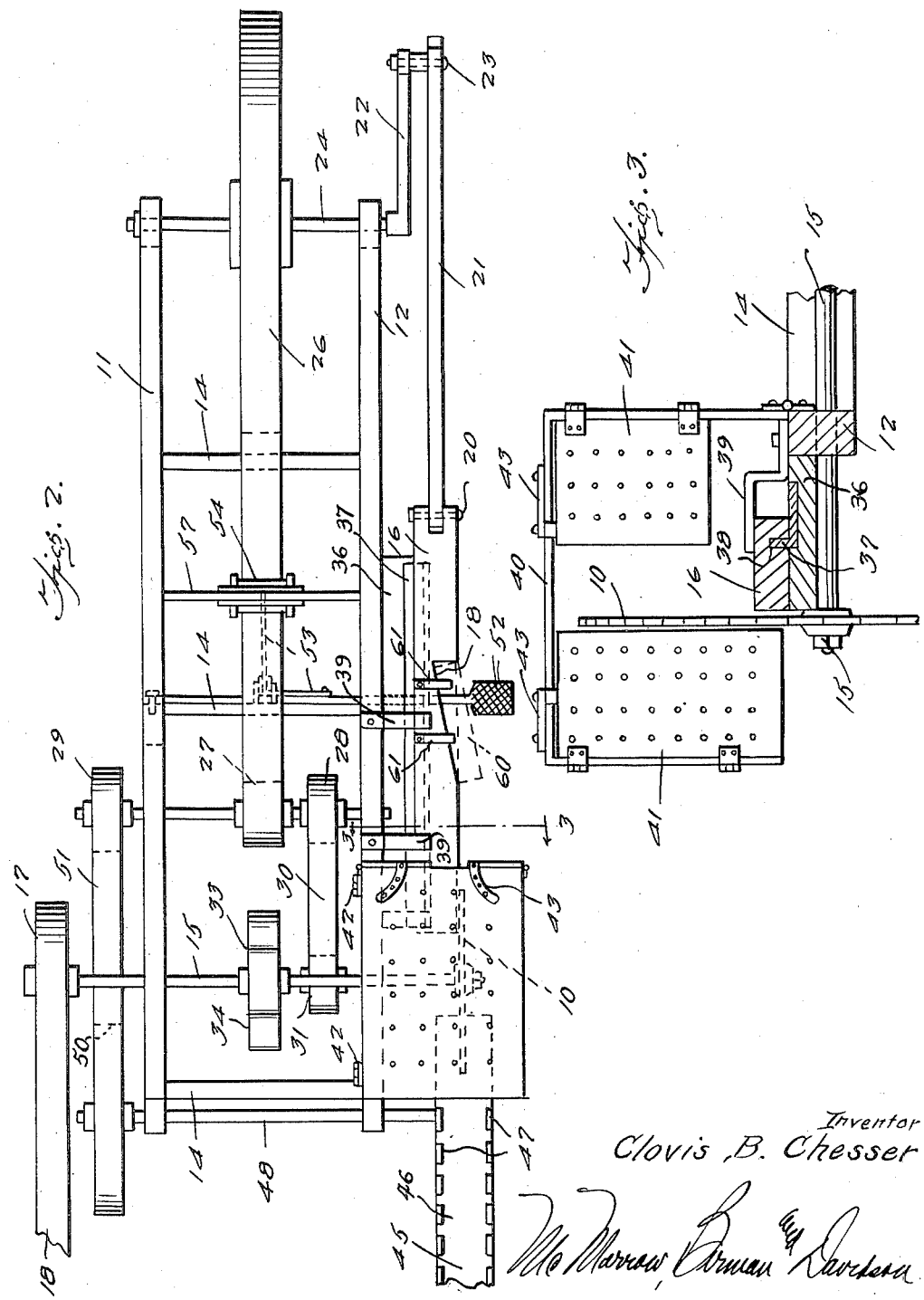

2,505,524

UNITED STATES PATENT OFFICE 2,505,524

MACHINE FOR MAKING WEDGES

Clovis B. Chesser, Albany, Ohio

Application April 9, 1946, Serial No. 660,792

2 Claims. (Cl. 143—53)

The present invention relates to woodworking machines and is more particularly concerned with a wedge cutting machine.

The primary object of the invention is to provide a machine of the character defined which will obviate hand pushing of the work pieces.

Another object of the invention is to provide a machine of this character which is calculated to speed up production.

A further object of the invention is to provide a wedge cutting machine which is easy and safe to operate.

Still another object of the invention is to provide a movable carriage for the work piece which is powered by a common source operating other components of the machine.

With the foregoing and other objects and advantages in view the invention consists of the novel construction and arrangement of parts hereinafter described and claimed.

In the accompanying drawings illustrating the preferred embodiments of the invention:

Figure 1 is a side elevation of the invention.

Figure 2 is a top plan view thereof.

Figure 3 is a vertical section on line 3—3 of Figure 2, and

Figure 4 is a bottom plan view, enlarged, of the work-piece carriage.

Like numerals, as used in the description and drawings, designate the same structural parts.

This wedge-cutting machine comprises a rotary rip saw 10, disposed in a vertical plane and suitably mounted in a frame or bench comprising horizontal beams 11 and 12 and sills supported on vertical standards or legs 13 and secured together at intervals by cross-trusses 14. In form the frame is oblong and the arbor 15 of the saw is mounted transversely thereof in suitable bearings positioned under the frame to lower the center of the saw for suitable apposition with a movable work carriage consisting of an elongated reciprocatory bar 16. The axis of the saw is preferably below the tops of beams 11 and 12.

The saw arbor extends beyond beam 11 and is rotated by a driven pulley 17 on the end which derives power from a suitable source by pulley belt 18.

The bar 16, which is rectangular, is provided in one side and approximately midway the ends with an angular recess or notch 18, shaped to the form of a wedge. One end of the bar is bifurcated as at 19 and the ears thus formed are perforated to receive a hinge bolt 20, which joins the bar to a pitman 21 designed to impart reciprocatory motion to the bar.

The other extremity of the pitman is joined to a perforated rotary arm 22 by an adjustable pivot bolt 23 and said arm is secured fixedly on one end of pulley shaft 24 operated by large pulley 25. The belt 26 which operates pulley 25 is mounted loosely on a small pulley 27, the shaft of which also carries two other pulleys 28 and 29, and is journaled in sills 59.

Pulley 28 is connected by a belt 30 to a pulley 31 on a shaft 32 in sills 59 and below arbor 15. The two pulleys 28 and 31 serve to reduce the speed communicated to the work carriage from driven pulley 17.

Mounted on saw arbor 15 is a reduction pulley 33 deriving power from power belt 18. This small pulley is connected by belt 34 to a relatively larger pulley 35 on shaft 32 thus imparting power thereto to operate the aforesaid pulleys and pitman 21.

Secured on the outside of beam 12, contiguous to the saw is a rectangular table 36 which extends only to the vicinity of the saw, thus permitting same to be removed. This table is recessed longitudinally and secured therein is an L-iron 37, with one flange countersunk flush with the surface of the table and the other flange projecting above the table top. The projecting flange is designed to fit in a longitudinal channel 38 on the underside of reciprocatory bar or carriage 16 and serve as a track or guide rail.

Mounted on the table top at suitable intervals are angle-irons 39 whose upwardly offset arms project over the bar 16 and serve to hold it in place on the table top with its notched side in proximity to the saw.

A safety device in the form of a rectangular hood 40, with open bottom and rear, and a front closed by hinged doors 41, is hinged on the side to beam 12, as at 42, to serve as a cover for the saw when in operation and thereby protect the operator of the machine from injury by defective wedges. The saw cover is preferably constructed of perforated metal, such as sheet iron, and is fastened down by any suitable means such as hooks or latches removably attaching to the table. Arcuate strips 43 with a plurality of perforations for adjustment purposes, are attached to the tops of front doors 41, thus permitting the latter to be opened or adjusted to allow wide blocks or workpieces to be sawed. These arcuate strips are secured in any adjusted position by pins passed through perforations in the top of the safety cover which register with the perforations in said strips.

Constructed as above described, the safety cover or guard for the saw, will allow the operator to watch the action of the saw.

Secured to the underside of the table and beneath the saw is a chute 44 designed to receive the wedges when manufactured and feed them onto a conveyor 45 which comprises an endless moving belt 46 with perpendicular strips 47 on each side to prevent the wedges from falling off. Conveyor belt 46 is operated by pulley 48 mounted on a rotary shaft 49 journaled on the front sides of the end legs or standards 13. A larger pulley 50 is secured on the opposite end of shaft 49 and connected by belt 51 with the smaller pulley 29 on the same shaft that rotates the pulley 27 and operates the pitman 21 and work carriage 16.

For the purpose of operating the pitman the feed belt 26 from pulley 27 has an extra amount of slack and this is controlled by belt-tightening means suspended from beams 11 and 12. These means are operated by a foot lever 52 and connecting cable 53 and pulleys secured to the frame.

The means comprise two flanged pulleys 54 journaled in tandem in a pulley block 55, so that one pulley can contact the upper side of the feed belt and the other contact the underside thereof. The bottom of the block is fastened to the end of cable 53 while the upper end is attached to a coiled spring 56 depending from a suspension rod 57 secured to beams 11 and 12. The foot lever, which is located in proximity to the work carriage 16, is pivotally secured to a rear leg 13 and serves to take up slack in belt 26.

Cable 53 is connected to this lever between its pivotal point and the pedal. When it is desired to stop the carriage for any purpose the operator releases the lever, thus allowing spring 56 to disengage the feed-belt tightener. When the belt becomes loose the normal slack therein slips on pulley 27 with a consequent loss of frictional engagement. Such disengagement however does not interfere with normal rotation of the saw, as will be obvious. A work-piece of lumber is indicated by dotted lines, as at 60 in Figure 2, positioned in the recess 18 of the carrier 16 preparatory to being fed to the saw.

Any suitable clamping means, such as spring clamps 61 attached to carriage 16, may be used to hold the work-piece or block 60 in the recess 18 while being cut to wedge shape.

As different embodiments may be made of this inventive concept and modifications may be made in the embodiments hereinbefore shown and described, it will be understood that the matter herein is to be interpreted as illustrative merely, and not in a limiting sense.

What I claim is:

1. In a machine for cutting wedges, including a rotary saw, a stationary table contiguous thereto; the improvement comprising a reciprocating bar, said bar being formed to provide a laterally-disposed angular recess therein for the reception of a work piece, said bar being formed with a longitudinally-extending groove in the under surface thereof, an angle iron including a horizontal and a vertical flange, means mounting said angle iron longitudinally of said table with said vertical flange extending vertically thereof and slidably received in said groove to guide said bar, said table including means slidably engaging the upper surface of said bar to retain the same against vertical displacement relative to said table, spring means carried by said bar and overlying said angular recess, and said spring means being adapted to press a work piece resiliently against said table.

2. In a machine for cutting wedges, including a rotary saw, a stationary table contiguous thereto; the improvement comprising a reciprocating bar, said bar being formed to provide a laterally-disposed angular recess therein for the reception of a work piece, said bar being formed with a longitudinally-extending groove in the under surface thereof, an angle iron including a horizontal and a vertical flange, means mounting said angle iron longitudinally of said table with said vertical flange extending vertically thereof and slidably received in said groove to guide said bar, said table including at least two longitudinally-spaced arms overlying said bar and slidably engaging the upper surface of said bar to retain the same against vertical displacement relative to said table, spring means carried by said bar and overlying said angular recess, and said spring means being adapted to press a work piece resiliently against said table.

CLOVIS B. CHESSER.

REFERENCES CITED

The following references are of record in the file of this patent:

UNITED STATES PATENTS

| Number | Name | Date |
|---|---|---|
| 285,407 | Gretschel | Sept. 25, 1883 |
| 621,488 | Clarke | Mar. 21, 1899 |
| 1,135,168 | Edman | Apr. 13, 1915 |
| 1,499,198 | Swenson | June 24, 1924 |
| 1,519,354 | Brown | Dec. 16, 1924 |
| 1,681,832 | Wuef | Aug. 21, 1928 |
| 2,083,435 | Dahlin | June 8, 1937 |
| 2,313,686 | Uremovich | Mar. 9, 1943 |

FOREIGN PATENTS

| Number | Country | Date |
|---|---|---|
| 513,695 | Germany | Dec. 1, 1930 |